March 4, 1924.
N. W. TRAUTNER
GREASE RETAINER
Filed Oct. 28, 1921
1,486,060
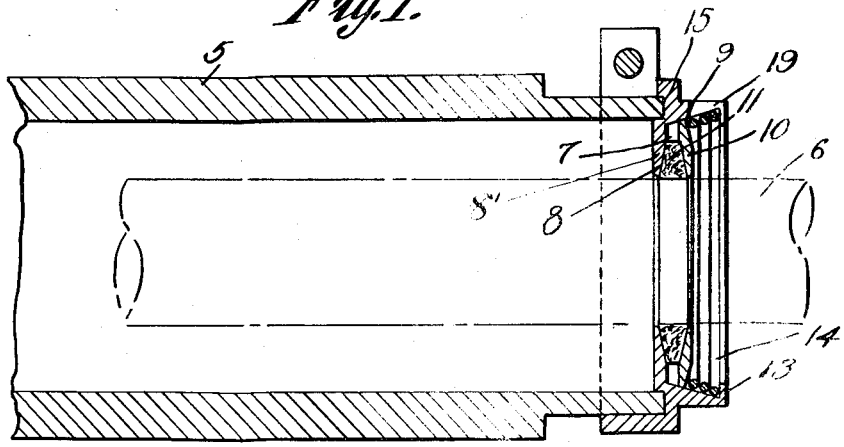
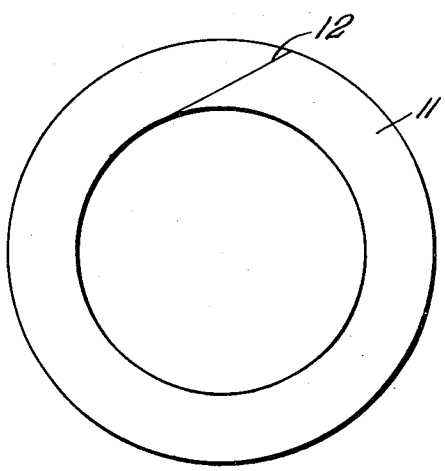
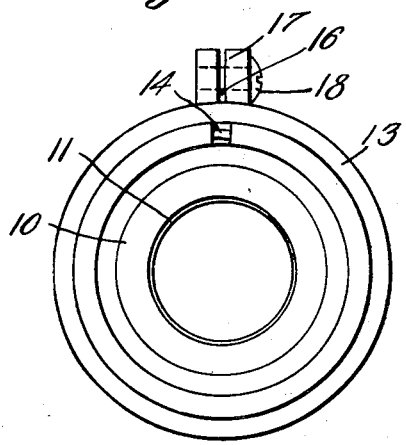
N. W. Trautner, Inventor
By C. A. Snow & Co.
Attorney Patented Mar. 4, 1924.

1,486,060

UNITED STATES PATENT OFFICE.

NICHOLAS W. TRAUTNER, OF ST. PAUL, MINNESOTA.

GREASE RETAINER.

Application filed October 28, 1921. Serial No. 511,200.

*To all whom it may concern:*

Be it known that I, NICHOLAS W. TRAUT-NER, a citizen of the United States, residing at St. Paul, in the county of Ramsey and State of Minnesota, have invented a new and useful Grease Retainer, of which the following is a specification.

This invention relates to axle housings or the like, and aims to provide novel means to insure against oil or grease being forced laterally through the usual felt washer employed for providing a liquid-tight connection between the axle and its housing.

Another object of the invention is to provide automatically controlled means for exerting pressure on the washer to cause the same to closely engage the axle associated therewith at all times, and compensate for the wear on the washer.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a sectional view through an axle housing disclosing a packing ring as supported therein.

Figure 2 is an end elevational view.

Figure 3 is a plan view of one of the washers used in connection with the device.

Referring to the drawing in detail, the reference character 5 designates the axle housing, housing the rear axle of a motor vehicle, the axle being shown in dot and dash lines, and indicated by the reference character 6.

Supported at one end of the axle housing is a grease retainer 7, which includes an inwardly extended flange 8' formed with an inclined wall 8. On the interior of the grease retainer 7, there is formed an inclined wall 9, said inclined wall 9 being adapted to cam the washer 10 inwardly towards the axle.

This washer is also provided with an inclined surface adapted to engage the packing ring 11, which may be constructed of any suitable packing material, and as shown, this packing ring is split as at 12, so that the diameter thereof may be adjusted with respect to the axle supporting the same.

Formed at the outer end of the retainer, is a circular flange 13 providing a shoulder at one end of the coiled spring 14 which has its inner end contacting with the washer 10 to normally exert an inward pressure on the washer.

The grease retainer is also formed with a groove 15 adapted to receive one end of the axle housing 5 as clearly shown by Figure 1 of the drawing, so that movement of the retainer with respect to the axle housing 5 will be prevented. As shown, the grease retainer is split as at 16, and formed with ears 17, the ears being apertured to accommodate the bolt 18, by means of which the retainer may grip the axle housing and be secured against displacement.

Formed in the wall of the grease retainer, is an opening indicated at 19, whereby a suitable tool may be positioned under one of the coils of the spring 14 to remove the same, in the event that it becomes necessary to replace the washer or packing ring 11.

From the foregoing it will be seen that as the washer or ring 11 wears, the tension of the coiled spring 14 exerting a pressure on the ring, will cause the same to move over the inclined surfaces of the retainer and washer 10, to the end that the ring 11 will be held into engagement with the axle associated therewith to accomplish its purpose.

Having thus described the invention, what is claimed as new is:—

In a grease retainer, a body portion having an inner circular flange formed with an inclined wall, the side wall of the grease retainer having its inner surface inclined, a washer positioned in the grease retainer and having an inclined wall cooperating with the inclined wall of the flange, to grip a packing therebetween, said grease retainer having a circular flange at its outer end extending inwardly from the side wall thereof, a coiled spring disposed between the circular flange at the free end of the grease retainer, and the washer and said coiled spring adapted to press the washer into close engagement with the packing positioned between the washer and first mentioned flange to compress the packing.

In testimony that I claim the foregoing as my own, I have hereto affixed my signature in the presence of two witnesses.

NICHOLAS W. TRAUTNER.

Witnesses:
WM. C. KIRBY,
JOHN G. TREACY.